Jan. 8, 1924. 1,480,239
M. P. CHAPLIN
FRICTION CLUTCH
Filed Oct. 12, 1921
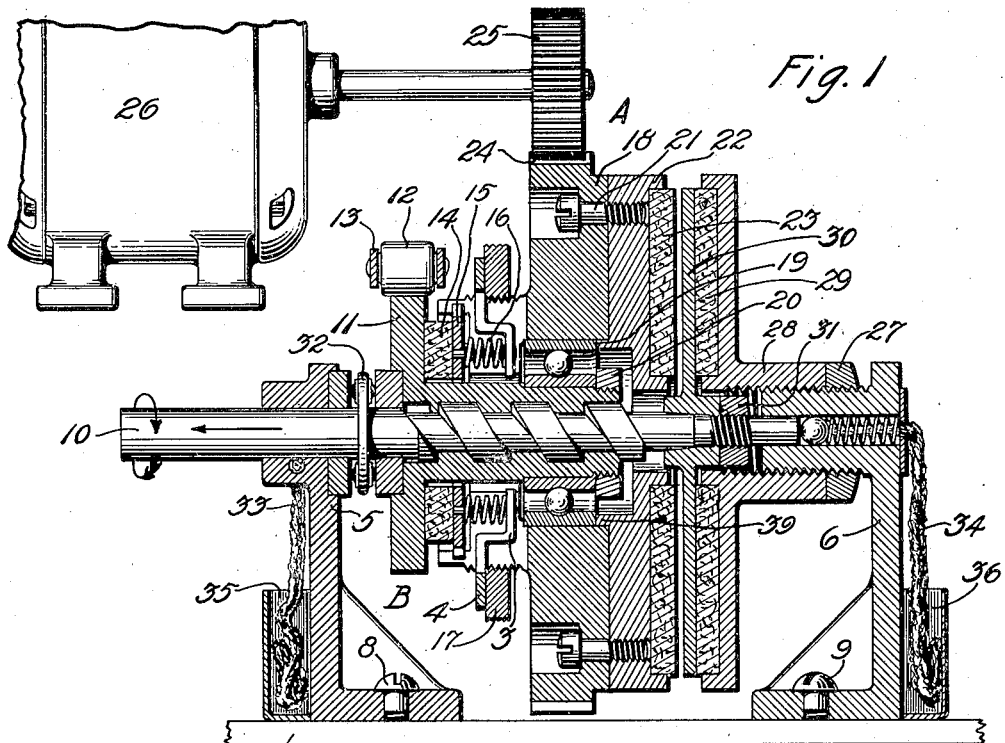
Fig. 1
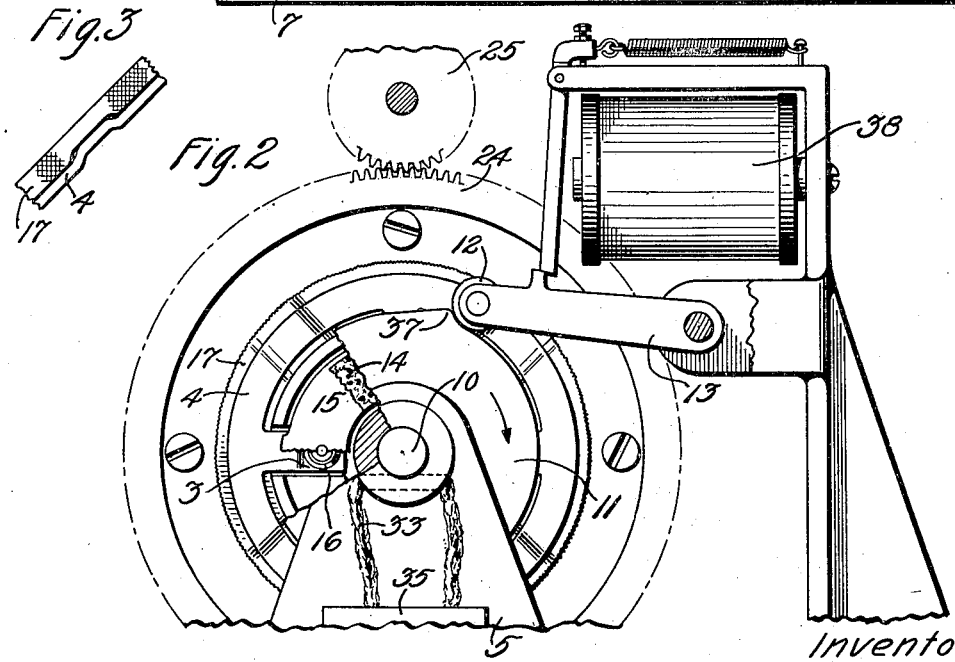
Fig. 3
Fig. 2
Inventor:
Merle P. Chaplin
by Joel C. R. Palmer
Att'y.

Patented Jan. 8, 1924.

1,480,239

UNITED STATES PATENT OFFICE.

MERLE P. CHAPLIN, OF WHITE PLAINS, NEW YORK, ASSIGNOR TO WESTERN ELECTRIC COMPANY, INCORPORATED, OF NEW YORK, N. Y., A CORPORATION OF NEW YORK.

FRICTION CLUTCH.

Application filed October 12, 1921. Serial No. 507,336.

*To all whom it may concern:*

Be it known that I, MERLE P. CHAPLIN, a citizen of the United States, residing at White Plains, in the county of Westchester, State of New York, have invented certain new and useful Improvements in Friction Clutches, of which the following is a full, clear, concise, and exact description.

This invention relates to friction clutches. An object of the invention is to provide a friction clutch having main and auxiliary clutch members in which the main driving and driven members are normally out of engagement, and are arranged to be brought into engagement and moved out of engagement by the auxiliary clutch members.

Another object of the invention is a friction clutch which is practically noiseless, and one which will readily adjust itself to changes in load conditions.

Another object is a friction clutch which has a low starting torque and is positive in operation.

Other objects will appear hereinafter.

A friction clutch made in accordance with this invention has the following advantages:

It is efficient and durable.

It has the driving and driven members of the main clutch normally out of engagement, thereby minimizing the wear between such parts.

The friction material through which power is communicated to the auxiliary clutch may be readily and expeditiously replaced.

Referring to the drawing:

Fig. 1 is a longitudinal cross section of the friction clutch.

Fig. 2 is an end view of the structure shown in Fig. 1, looking from the left.

Fig. 3 is a detail of a part of the clutch.

The invention in general consists of a main clutch A having a driving member continuously driven by power communicated thereto from a motor of any well known type, and an auxiliary clutch B for controlling the main clutch A.

The construction of the clutch is as follows: Extending longitudinally between a pair of uprights 5 and 6, which are secured to a base 7 by means of screws or bolts 8 and 9, is a shaft 10. Formed on a portion of the shaft 10 are a number of helical threads designed to be engaged by similar threads in a circular member 11, which forms a part of the auxiliary clutch B. Normally the member 11 is held against rotation due to the engagement of a roller 12 secured at one end of a latch 13, with a cam stop 37 on the member 11. The latch 13 may be released by an electromagnet 38, as shown in Fig. 2, or any well-known means.

Disposed on one side of the member 11 is a disc of friction material 14 circular in shape, such as wood, or any other well known kind of material having a low coefficient of friction. A circular metal disc 15 having holes bored therein at a plurality of points for receiving one end of a number of coiled springs 16, which serve to hold the disc 15 in engagement with the friction material 14, is arranged on the other surface of the disc of friction material 14. The springs 16, there being in the preferred form of the invention four in number, are carried by the radially extending arms 3 integrally joined by a ring 4 and which is held in place as shown in Figs. 1 and 2, by means of an adjustable nut 17 screwed to an irregular circular member 18, forming a part of the main clutch A. In accordance with the showing of Figs. 1 and 3, the adjustable nut 17 has four depressions spaced at equal distances, and the metal of the ring 4 bent to form projections which coincide with these depressions and which are held therein by their frictional engagement with the walls of the depressions. When the nut 17 is turned, the pressure on springs 16 is increased or decreased according to the direction which the nut is turned and the nut may then be locked by the engagement of the projections of the ring 4 with the depressions in the nut 17. In other words, a jockey action is produced between the two elements and the adjustable nut locked in its set position. Thus, by means of the nut 17, the tension on the springs 16 may be adjusted to vary the pressure applied to the disc of friction material 14, and consequently the frictional engagement between this disc and the member 11.

The member 18, in the preferred form of the invention, is of very heavy material to form a constantly rotating fly wheel. For permitting the free rotation of the member 18, a ball bearing 19 is provided, which is positioned about a portion of the member 11. The ball bearing 19 is held against lateral movement by a nut 20 adapted to be screwed to one end of the member 11. Secured to the member 18 by means of screws 21, is another circular metal disc 22, having the face opposite to the one in engagement with the member 18 recessed to allow a disc of friction material 23, which may be any friction material having a very high coefficient of friction, such as cork, to be securely fastened therein. This disc 22 also has an extension 39 which serves to retain a part of the ball race 19 in position.

The periphery of the member 18 has formed therein a series of teeth 24, which are adapted to be engaged by the teeth in a pinion 25, secured to the shaft of a motor 26. In this way power will be communicated to the member 18 from the motor 26.

Secured to the upright member 6 by means of threads formed thereon and a nut 27, is a piece 28 with a projecting hub engaging an extension on this upright member 6, one face of which is also recessed to receive a disc of friction material 29. This disc of friction material 29, like 23, is preferably of cork or any other well known type of friction material having a very high coefficient of friction. Interposed between the discs 23 and 29 is a circular metal disc 30 which is secured to the shaft 10 by means of a nut 31. In order to secure a close fit, prevent rotation and end movement between the shaft 10 and the circular disc 30, the hub portion of the disc is taper keyed to engage a like surface on the shaft 10. Thus, by means of the nut 31, the disc 30 can be securely held in place.

On account of the excessive force applied to the uprights 5 and 6 upon the stoppage of the member 11, as will be hereinafter more clearly described, a thrust bearing 32 is interposed between a surface of the upright 5 and a surface of the member 11, to absorb the thrust force and still produce a minimum amount of friction between these two members.

Oil may be supplied to the bearings by means of oil wicks 33 and 34, which extend from the bearings to oil cups 35 and 36, respectively.

The operation of the clutch is as follows: Assuming that power is applied to the member 18 from the motor 26 through the pinion 25, this member together with the disc 14, will be revolved. The member 11, however, will not be revolved owing to the engagement of the roller 12 with the cam stop 37 forming a part of this member. Likewise shaft 10 remains at rest owing to the non-engagement of the disc 23 with the metal disc 30. The member 18 together with the disc 14, and the other parts forming a part of the driving member A, will continue to rotate in this manner until the latch 13 is withdrawn to permit the cam stop 37 to pass the roller 12.

Upon withdrawal of the roller 12 from engagement with the cam stop 37, the member 11 will be caused to rotate due to the engagement of the friction material 14 with a surface thereof. Immediately after the release of the member 11, owing to the helical threads on the shaft 10 being in engagement with similar threads formed in the member 11, the shaft 10 is caused to move a short distance longitudinally in the direction of the arrow. The clutch member A and rotating fly wheel mounted thereon will not move longitudinally owing to its much greater weight. Thus, since the disc 30 is securely fixed to the shaft 10, this disc likewise moves and engages the disc of friction material 23. Upon the engagement of the disc 30 with the disc 23, the shaft 10 will be caused to rotate by power communicated thereto directly until the member 11 is stopped, due to the engagement of the roller 12 with the lip 37, which will be once for each revolution unless the latch 13 is withdrawn for a period longer than required for the member 11 to complete one cycle. However, in the preferred form of the invention, the member 11 will be stopped once in each revolution. Upon the engagement of the roller 12 with the cam stop 37 following the rotation of this member, the shaft 10 on account of its inertia continues to rotate and by reason of the threads thereon engaging that of member 11, now at rest, causes the shaft to move longitudinally in a direction opposite to the arrow, whereby the disc 30 disengages the rotating disc 23 and engages the stationary disc 29. It is thus evident that the disc 29 serves as a buffer to retard the rotation of the disc 30 together with the shaft 10 and thereby causes the stoppage of the shaft.

Although the invention has been illustrated in connection with a member which is intermittently set in rotation, it is, of course, obvious that the invention may be applied to many other types of clutches without departing from the spirit and scope of the invention.

What is claimed is:

1. In combination, a driving member, a driven member normally tending to rotate, a shaft also to be driven, and a driving coupling on said shaft rendered effective upon the release of said driven member, whereby power is communicated to said shaft independent of said driven member.

2. In combination, a driving member, a member normally tending to rotate, a shaft to be driven, and a disc having a plain surface secured to said shaft and arranged upon the release of said member to engage a surface of said driving member, whereby power is communicated directly to said shaft.

3. In combination, a driving member, a member normally tending to rotate, a disc of friction material engaging a surface of said member normally tending to rotate and continuously rotated with said driving member, a plurality of springs, and adjusting means forming a part of said driving member to permit a variation in the spring tension applied to said friction disc, a shaft to be driven, and a metal disc secured to said shaft, and arranged upon the release of said member which normally tends to rotate to engage a surface of said driving member, whereby power is communicated directly to said shaft.

4. In combination, a driving member, a driven member normally tending to rotate, a shaft also to be driven, a driving coupling on said shaft rendered effective upon the release of said driven member whereby power is communicated to said shaft independent of said driven member, and means effective upon the stoppage of said driven member to cause the disengagement of said driving coupling and the stopping of said shaft.

5. In combination, a driving member, a circular disc of friction material secured to said driving member, a member normally tending to rotate, a shaft to be driven, a disc secured to said shaft, and arranged upon the release of said member which normally tends to rotate to engage said disc of friction material for effecting a driving connection between said driving member and said shaft.

6. In combination, a driving member, a circular disc of friction material secured to said driving member, a member normally tending to rotate, a shaft to be driven, a disc secured to said shaft, and arranged upon the release of said member which normally tends to rotate to engage said disc of friction material for effecting a positive drive connection between said driving member and said shaft, and means effective upon the stoppage of said member to cause the disengagement of said disc with said disc of friction material.

7. In combination, a driving member, a circular disc of friction material secured to said driving member, a member normally tending to rotate, a shaft to be driven, a disc secured to said shaft, and arranged upon the release of said member which normally tends to rotate to engage said disc of friction material to provide a direct driving connection between said driving member and said shaft, and a stationary disc of friction material arranged upon the stoppage of said member to be engaged by said disc for causing the retardation of the rotation of said shaft.

8. In combination, a continuously rotating member, a driven member, a driving connection between said rotating member and said driven member normally tending to rotate the same, consisting of a single piece of friction material of comparatively low coefficient of friction, a shaft also to be driven, and means rigidly secured to said shaft, and rendered effective upon the release of said driven member for establishing an independent driving connection between said continuously rotating member and said shaft.

9. In combination, a continuously rotating member, a driven member, a driving connection between said continuously rotating member and said driven member normally tending to rotate the same, consisting of a single piece of friction material of comparatively low coefficient of friction, spring pressed means for maintaining a connection between said driven member and said friction material, a shaft also to be driven and means rigidly secured to said shaft and rendered effective upon the release of said driven member for establishing an independent driving connection between said continuously rotating member and said shaft.

10. In combination, a driving member, a member normally tending to rotate, a shaft to be driven, a disc secured to said shaft, means for causing the release of said second recited member, and means effective following the release of said member for causing said disc to engage a surface of said driving member to form a direct driving connection between said driving member and said shaft.

11. In combination, a continuously rotating member, a shaft to be driven having a series of helical-shaped threads formed on a portion thereof, a driven member normally tending to rotate with threads engaging the threads on said shaft, a disc secured to said shaft, and means for releasing said driven member, whereby a screw motion is imparted to said shaft to cause said disc to move longitudinally and engage a surface of said continuously rotating member for effecting a driving connection between said rotating member and said shaft.

In witness whereof, I hereunto subscribe my name this 8th day of October, A. D. 1921.

M. P. CHAPLIN.